United States Patent
Kurotori et al.

(10) Patent No.: US 6,333,803 B1
(45) Date of Patent: Dec. 25, 2001

(54) OPTICAL TRANSMITTER

(75) Inventors: Katsuya Kurotori; Haruki Ogoshi, both of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/202,525
(22) PCT Filed: Apr. 21, 1998
(86) PCT No.: PCT/JP98/01808
§ 371 Date: Jan. 25, 1999
§ 102(e) Date: Jan. 25, 1999
(87) PCT Pub. No.: WO98/49792
PCT Pub. Date: Nov. 5, 1998

(30) Foreign Application Priority Data

Apr. 25, 1997 (JP) .................................... 9-109904

(51) Int. Cl.[7] .................................................. H04B 10/04
(52) U.S. Cl. .................... 359/188; 359/122; 359/160; 359/156
(58) Field of Search .................. 359/156, 180, 359/181, 188, 160, 122, 134

(56) References Cited

U.S. PATENT DOCUMENTS 5,729,372 * 3/1998 Terahara et al. ............. 359/180
5,963,567 * 10/1999 Veselka et al. .............. 372/21
6,081,355 * 6/2000 Sharma et al. ............... 359/110

FOREIGN PATENT DOCUMENTS

| | | |
|---|---|---|
| A-4-281631 | 10/1992 | (JP) . |
| A-4-306928 | 10/1992 | (JP) . |
| A-5-224252 | 9/1993 | (JP) . |
| A-7-264166 | 10/1995 | (JP) . |
| A-8-18540 | 1/1996 | (JP) . |
| A-8-29814 | 2/1996 | (JP) . |

* cited by examiner

*Primary Examiner*—Kinfe-Michael Negash
(74) *Attorney, Agent, or Firm*—Oliff & Berridge, PLC

(57) ABSTRACT

An optical transmitter provided with a supercontinuum light source 4 which is composed of an optical amplifier 2 made by using a polarization maintaining amplification fiber 1 and a polarization maintaining fiber 3 which has a length of at least a specified value, is connected to the output side of the optical amplifier 2 and emits light having a continuous wave and a stable plane of polarization, a polarization maintaining optical demultiplexer 5 which takes out a light with a desired wavelength from the continuous wave light, and an external modulator 6 which superposes desired information upon the light with the desired wavelength.

8 Claims, 14 Drawing Sheets

OPTICAL TRANSMITTER

TECHNICAL FIELD

The present invention relates to optical transmitters applied in the field of optical communication and, more particularly, to optical transmitters which are useful for wavelength-division multiplexed(WDM) optical communication system.

BACKGROUND OF THE INVENTION

A prior art optical transmitter used for the wavelength-division multiplexed optical communication system has a construction as shown in FIG. 14, comprising a plurality of semiconductor lasers A of different oscillation wavelengths, the optical outputs of which are independently modulated either directly or externally for wavelength-multiplexed optical transmission. Up to date, an optical transmitter using a Fabry-Perot resonator or like optical resonator also has been developed. The optical resonator in this optical transmitter converts light from a light source to multiple mode light, which has a regular wavelength spacing and is modulated independently by a plurality of external modulators for the wavelength-multiplexed optical transmission.

In the wavelength-division multiplexed optical communication system, a bandwidth limitation to a range centered on the wavelength of 1,550 nm is imposed on an optical amplifier, which relays optical signal. For mass communication by providing a large number of optical signals in the limited range, it is necessary to prevent isolation deterioration of adjacent optical signal transmitted from the optical transmitter in long use by accurately controlling the optical signal wavelengths. However, in order to preclude wavelength variations due to the wavelength isolation deterioration and ensure stable oscillation wavelength of the light source semiconductor laser such as to meet the above requirements, highly advanced techniques are required, giving rise to an optical transmitter price increase. In the optical transmitter using the optical resonator, it is possible to use a semiconductor laser, which is subject to wavelength variations, as the light source without giving rise to the problem of the wavelength isolation deterioration. This is so because multiple mode light, which is free from wavelength variations and is modulated, can be obtained from the laser beam by a resonating action of an optical resonator. However, the multiple mode light generated by the optical resonator is peculiar thereto. This is undesired form that the standpoint of the free wavelength setting. For instance, it is difficult to set non-uniformly spaced-apart channels.

SUMMARY OF THE INVENTION

An optical transmitter according to the invention as set forth in claim 1 is, as shown in FIGS. 1 and 2, comprises a supercontinuum light source which is composed of an optical amplifier made by using a constant polarized wave amplification fiber and a constant polarized wave fiber which has a length of at least a specified value, is connected to the output side of the optical amplifier and emits light having a continuous wave and a stable plane of polarization, a constant polarized wave optical demultiplexer which takes out a light with a desired wavelength from the continuous wave light, and an external modulator which superposes desired information upon the light with the desired wavelength.

An optical transmitter according to the invention as set forth in claim 2, is the optical transmitter as set forth in claim 1, in which the constant polarized wave amplification fiber and/or the constant polarized wave optical fiber are/is of a dispersion shift type or a dispersion flat type.

An optical transmitter according to the invention as set forth in claim 3, is the optical transmitter as set forth in claim 1, in which continuous light is inputted as source light to the supercontinuum light source.

An optical transmitter according to the invention as set forth in claim 4, is the optical transmitter as set forth in claim 2, in which continuous light is inputted as source light to the supercontinuum light source.

An optical transmitter according to the invention as set forth in claim 5, is the optical transmitter as set forth in each of claims 1 to 4, in which light other than single-frequency (or single-wavelength) light is inputted as source light to the supercontinuum light source.

BEST MODE FOR CARRYING OUT THE INVENTION

Figure 1:
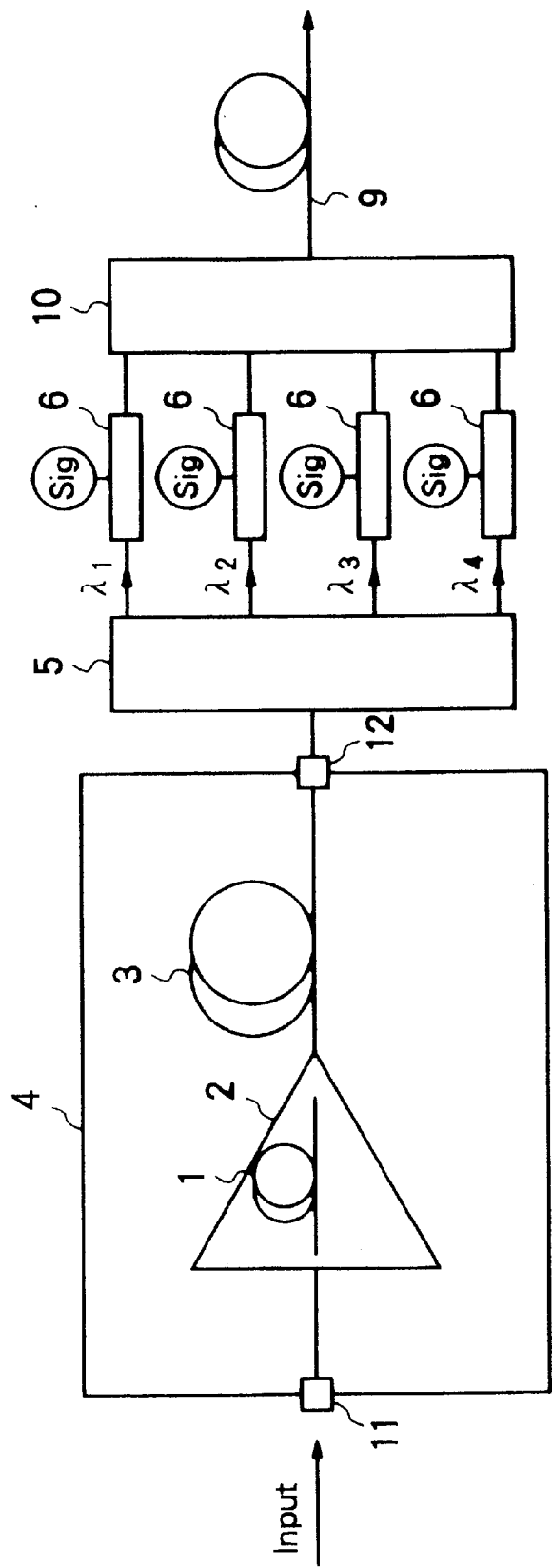
FIG. 1 is a schematic view showing an embodiment of the optical transmitter according to the invention.

FIG. 1 shows an embodiment of the optical transmitter according to the invention. The optical transmitter comprises a supercontinuum light source (i.e., a light source capable of generating light with a wavelength spread, hereinafter referred to as SC light source) 4 using constant polarized wave fibers, constant polarized wave optical demultiplexer 5 for branching light waves of wavelengths λ1 to λ4, respectively, of the light from the SC light source 4, external modulators 6 for externally modulating the branched wavelength light, respectively, according to data signal, and an optical multiplexer 10 for multiplexing the modulated optical signal outputs to generate a wavelength-multiplexed signal.

Figure 2:
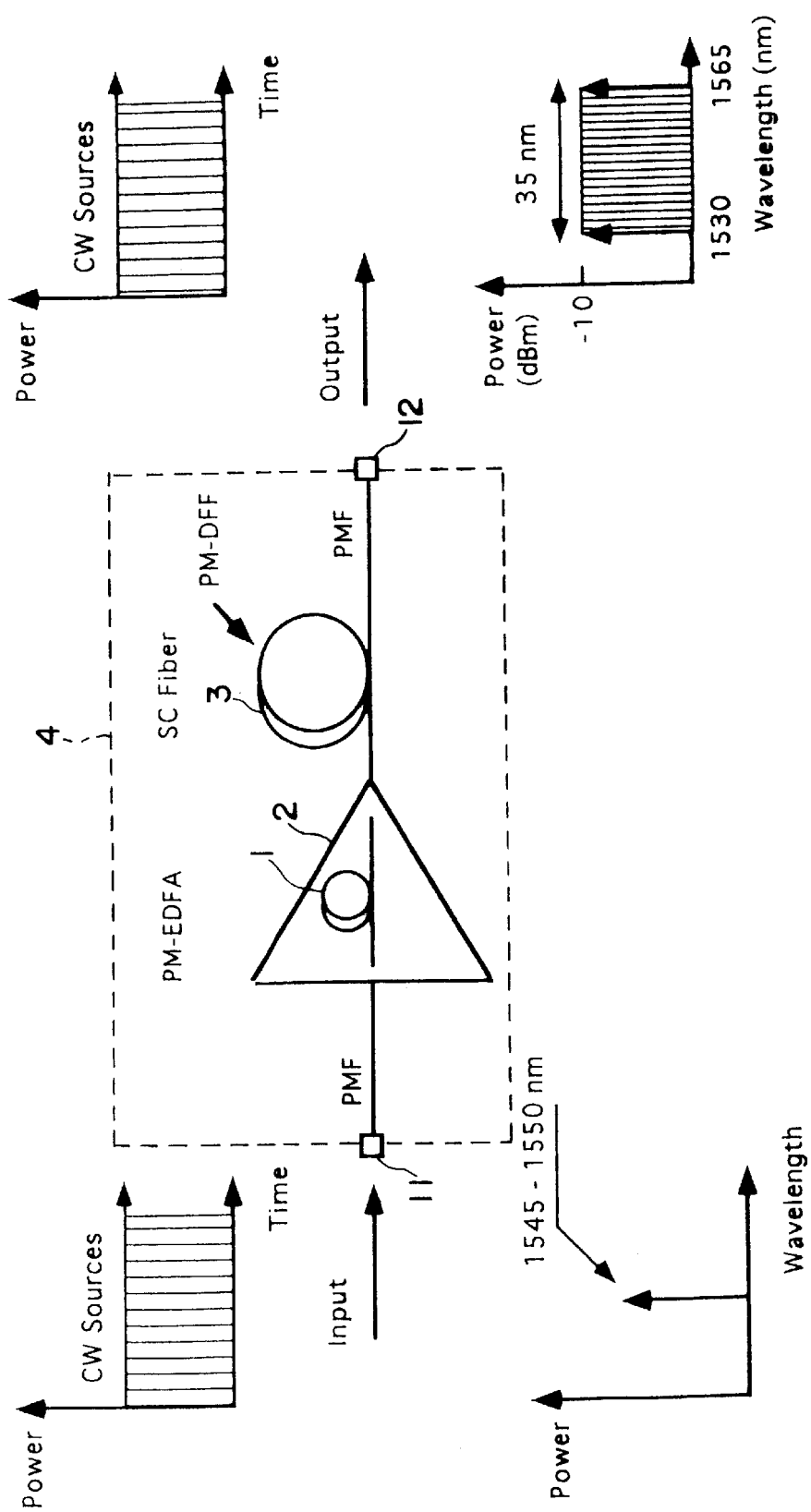
FIG. 2 is a schematic view showing a supercontinuum light source in the optical transmitter shown in FIG. 1.

As shown in FIG. 2 the SC light source 4 includes an optical amplifier 2 using a polarization maintaining amplification fiber 1, and polarization maintaining fiber 3 of a predetermined length (of about 1,300 m, for instance) connected to the output side of the optical amplifier 2. The source light inputted to an input section 11 of the SC light source 4, maintains a fixed plane of polarization until it reaches an output section of the light source. This polarization maintaining function permits increasing the efficiency of generation of FWM light in the SC light source 4. Light having a wavelength spread thus can be efficiently generated from the source light. For example, where the source light is CW light with a wavelength of 1,550 nm, the FWM permits generation of CW light with a wavelength spread of 1,530 to 1,565 nm. The fact that the polarization maintaining function has the effect of increasing the efficiency of the FWM light generation, will be described later in connection with an experiment example.

In the SC light source 4, suitably at least either the polarization maintaining amplification fiber 1 or the polarization maintaining fiber 3 is a dispersion shift type fiber or a dispersion flat type fiber. It is well known in the art that the FWM leads to a light generation efficiency increase in zero or nearly zero dispersion. The dispersion shift type fiber has zero dispersion at the wavelength of 1,550 nm, while the dispersion flat type fiber has zero or nearly zero dispersion over a wide wavelength range of 1,530 to 1,565 nm. For this reason, the efficiency of the FWM generation is increased in the wavelength range noted above.

The polarization maintaining optical demultiplexer 5 can each branch a light of a desired wavelength from the light from the SC light source 4, and they are commercially inexpensively available as passive components having stable secular characteristics. In this embodiment, four light waves of wavelengths λ1 to λ4 are filtered from the CW light of the SC light source 4. The polarization maintaining optical demultiplexer 5 permits a light wave of a desired wavelength to be readily derived by changing the branching characteristics.

The external modulators 6 may be ordinary polarization-dependent modulators, for instance lithium niobate external modulators. The external modulators 6 can superpose desired information for transmission in the form modulation of optical signal according to the information.

The optical multiplexer 10 multiplexes the modulated optical signals (of wavelengths λ1 to λ4), generated from the external modulators 6, and sends out the resultant optical signals to a transmission optical fiber 9.

EXPERIMENT EXAMPLE

Figure 3:
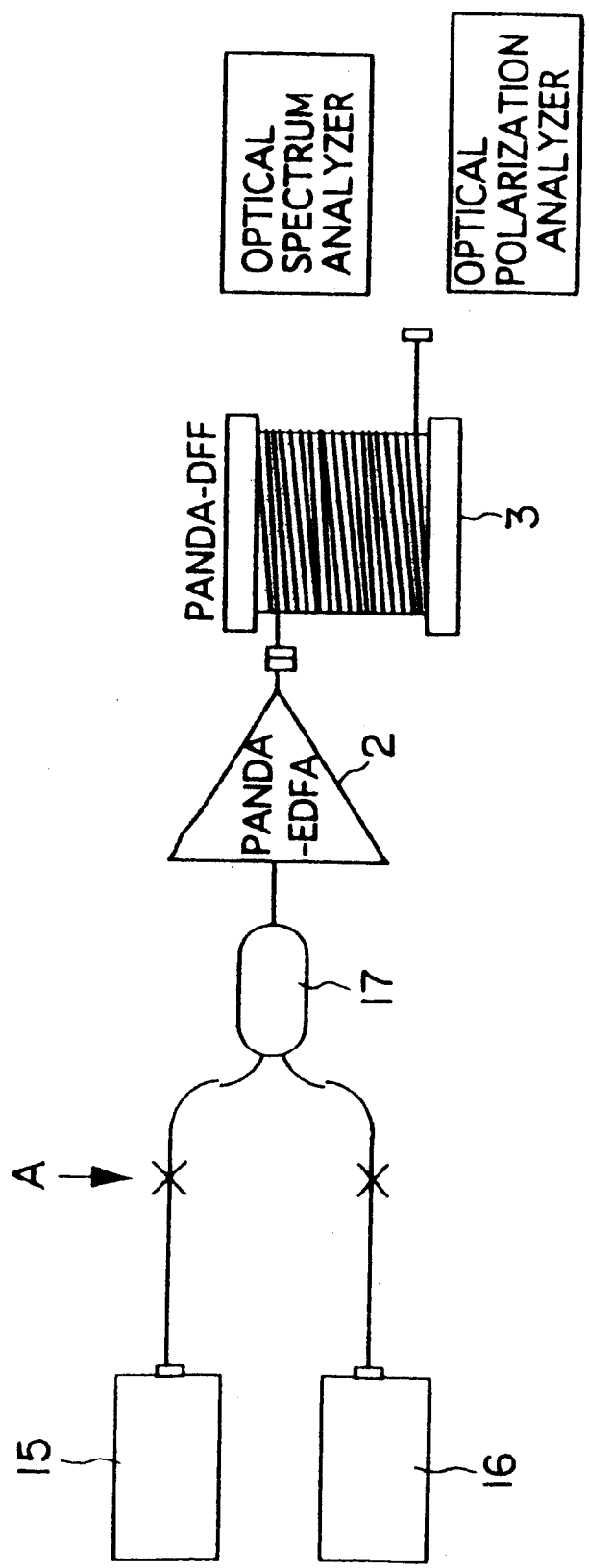
FIG. 3 is a schematic view showing measuring system for measuring Four-Wave Mixing (hereinafter referred to as FWM) light generation efficiency.

Experiments of measuring the efficiency of generation of FMW light of the SC light source 4 using the polarization maintaining fibers, were conducted by producing a measuring system as shown in FIG. 3. The measuring system is an experiment system based on polarization maintaining fibers, i.e., it comprises linearly polarized output laser diodes (LD) 15 and 16, a 3-dB polarization maintaining coupler 17, an optical amplifier (PANDA-EDFA) 2 constituted by a polarization maintaining fiber, and a polarization maintaining fiber (PANDA-DEF) 3.

Figure 4:
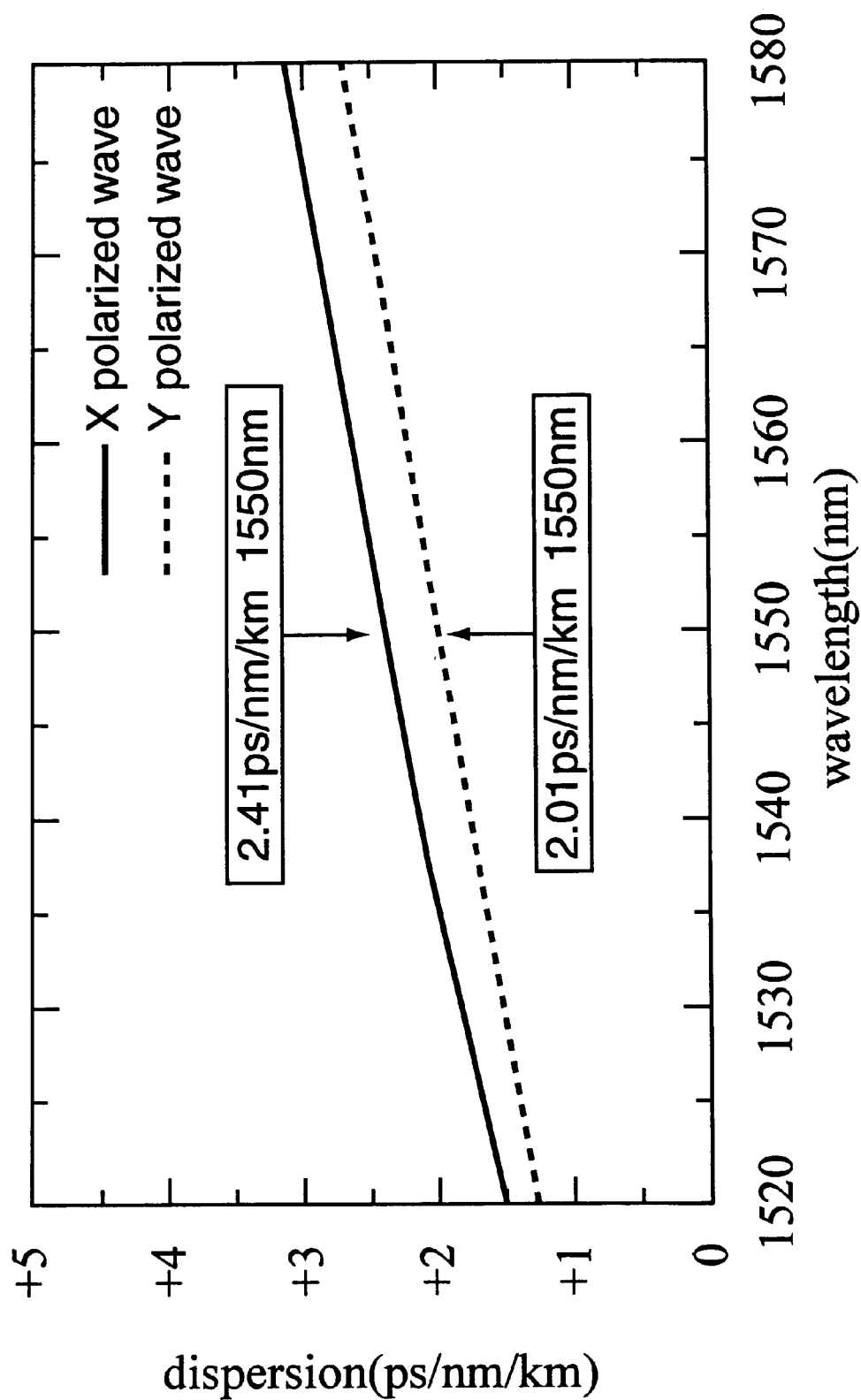
FIG. 4 is a view for describing dispersion characteristics of fibers used in the measuring system shown in FIG. 3.

The measurements were made to determine the dependency of the FWM light power on the incident beam polarization. The LD 16 was fusion spliced at fusion splicing point A by setting the X-Y coordinates of the two PANDAs in phase with each other. The LD 15, on the other hand, was fusion spliced at fusion splicing point A in two different states. Specifically, in one of these states, the X-Y coordinates of the two PANDAs were set in phase with each other, while in the other state they were set 90-degrees out-of-phase from each other. The polarization was analyzed by using a polarization analyzer, and the FWM spectrum was analyzed by using a spectrum analyzer. The polarization maintaining fibers used were of the specifications as shown in Table 1 and had the dispersion characteristics as shown in FIG. 4.

TABLE 1

| | |
|---|---|
| Loss (in dB/m) | 1.233 |
| Extinction ratio (in dB @ 100 m): | 30.0 |
| MFD (in μm): | 4.70 (in), 4.72 (out) |
| Length (in m): | 1,294 |

Figure 6A:
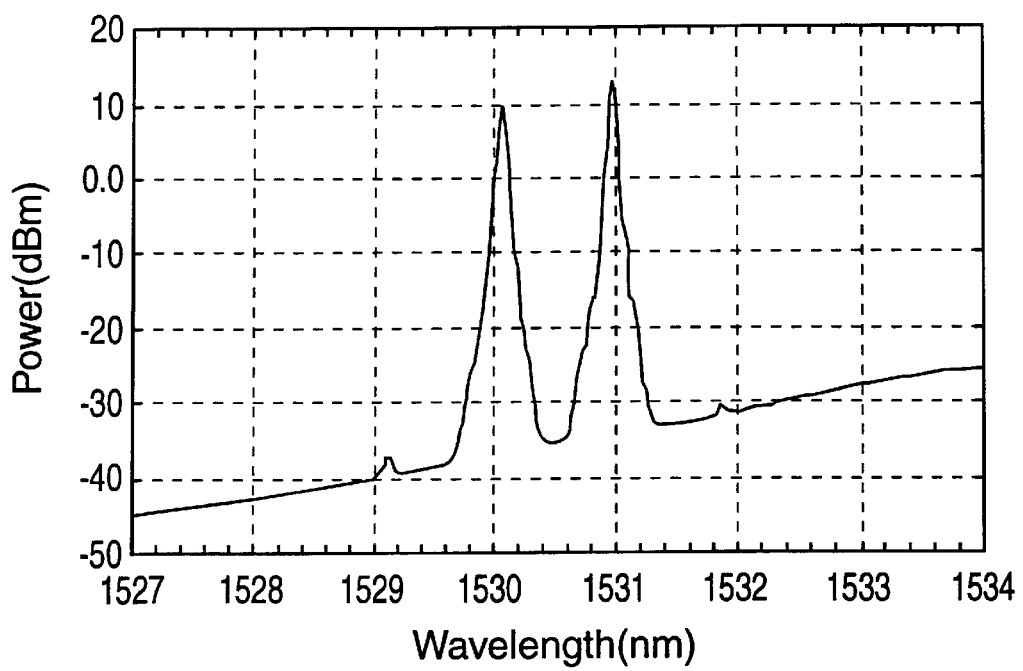
FIG. 6A is a view showing input side status for describing a first example of FWM light generation status with two lights.
Figure 6B:
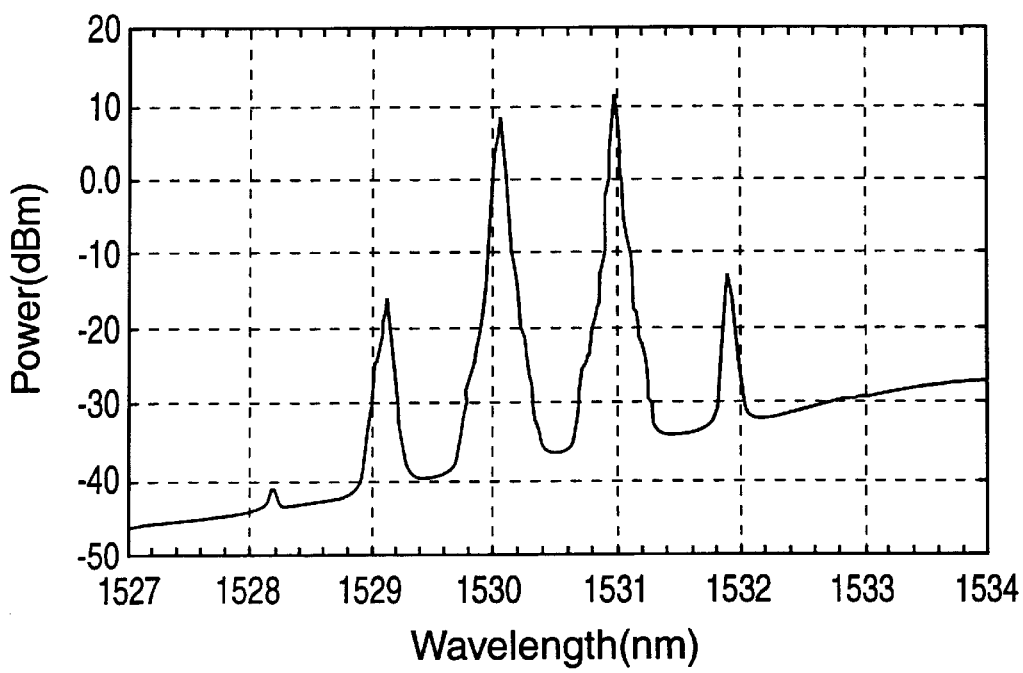
FIG. 6B is a view showing output side status.
Figure 7A:
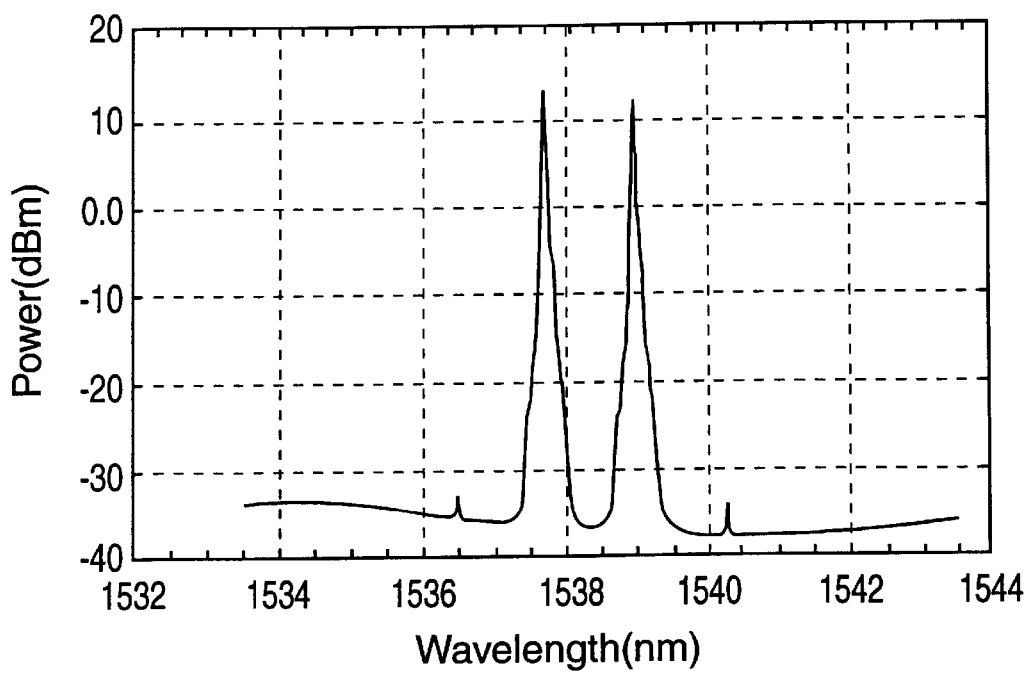
FIG. 7A is a view showing input side status for describing a second example of FWM light generation status with two lights.
Figure 7B:
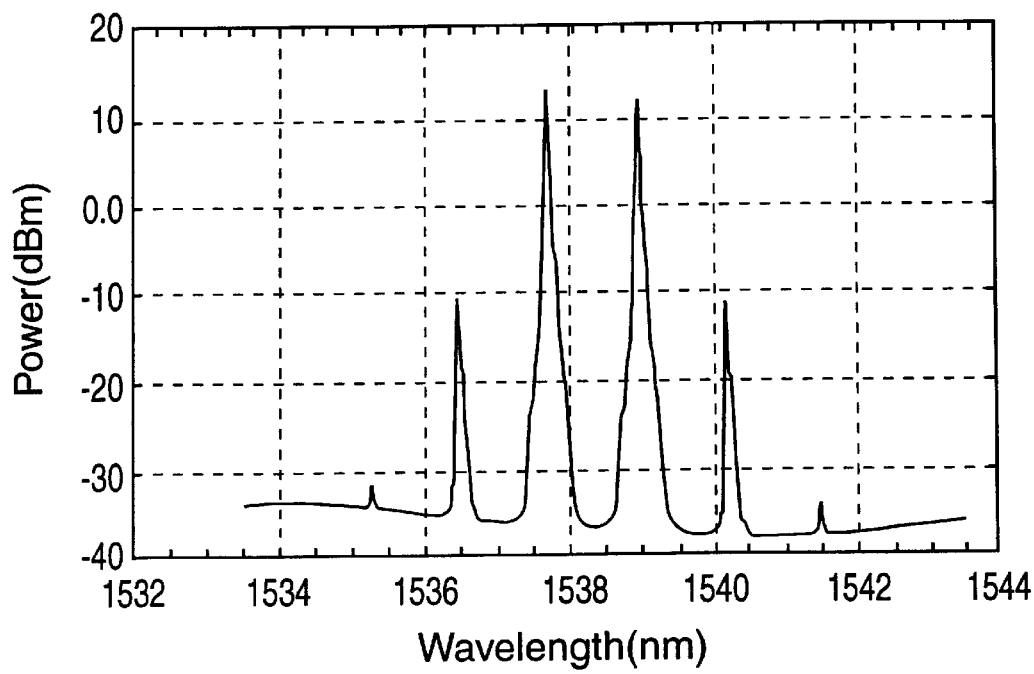
FIG. 7B is a view showing output side status.
Figure 8A:
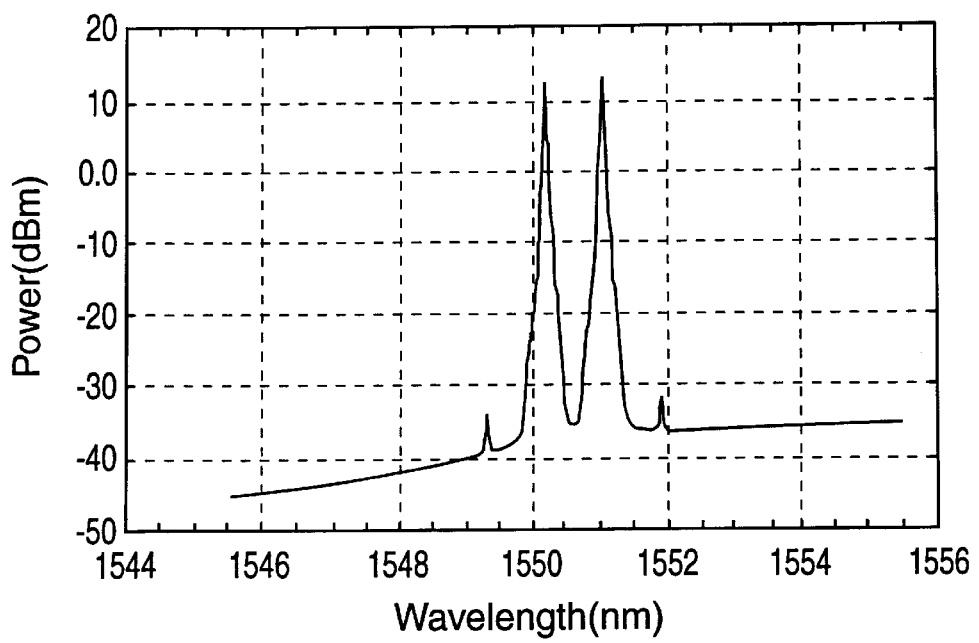
FIG. 8A is a view showing input side status for describing a third example of FWM light generation status with two lights.
Figure 8B:
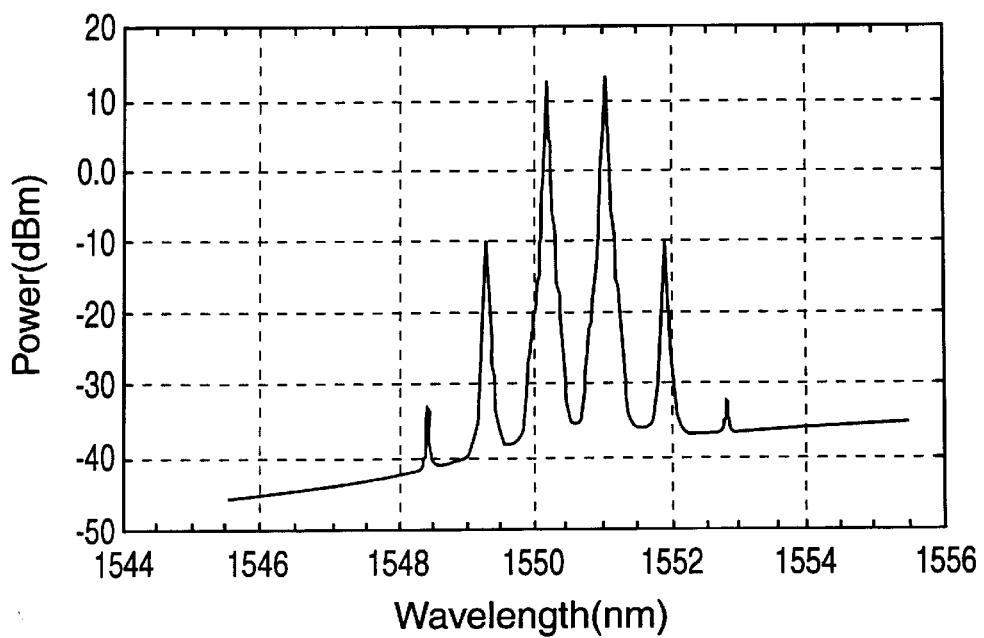
FIG. 8B is a view showing output side status.
Figure 9A:
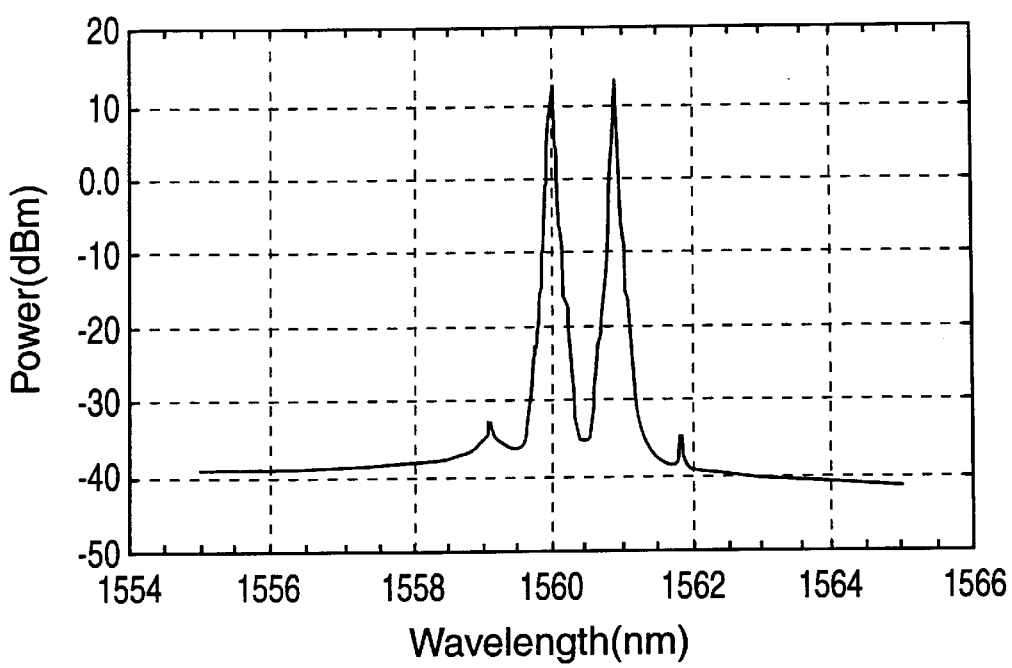
FIG. 9A is a view showing input side status for describing a fourth example of FWM light generation status with two lights.
Figure 9B:
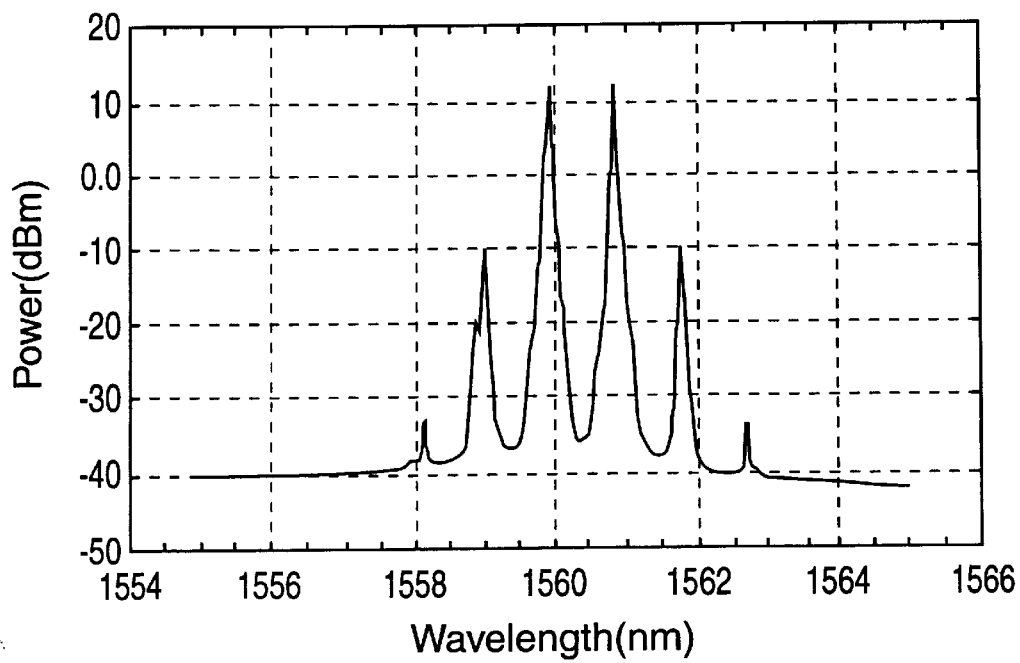
FIG. 9B is a view showing output side status.

FIGS. 6 to 9 show results of measurements in the case of fusion splicing the LD 15 by setting the X-Y coordinates of the two PANDAs in phase, i.e., setting the angle between the two input beam polarization planes to zero degree. In these Figures, the graph in A shows the state of the input light, and the graph in B shows the state of the output light. FIG. 6 concerns the case where the LDs 15 and 16 generate linearly polarized beams of 1.530 and 1.531 nm in wavelength, respectively. FIG. 7 concerns the case where the LDs generate linearly polarized beams of 1.538 and 1.539 nm in wavelength. FIG. 8 concerns the case where the LDs generate beams of 1.550 and 1.551 nm in wavelength. FIG. 9 shows the case where the LDs generate beams of 1.560 and 1.561 nm in wavelength. In either case, primary FWM light is generated on the input side. This light is thought to be generated in the polarization maintaining fiber in the PANDA-EDFA 2. As for the output light spectrum, secondary FWM light due to the FWM light and input light, and also tertiary FWM light although being weak, were observed in addition to the FWM light attributable to the input light.

Figure 10A:
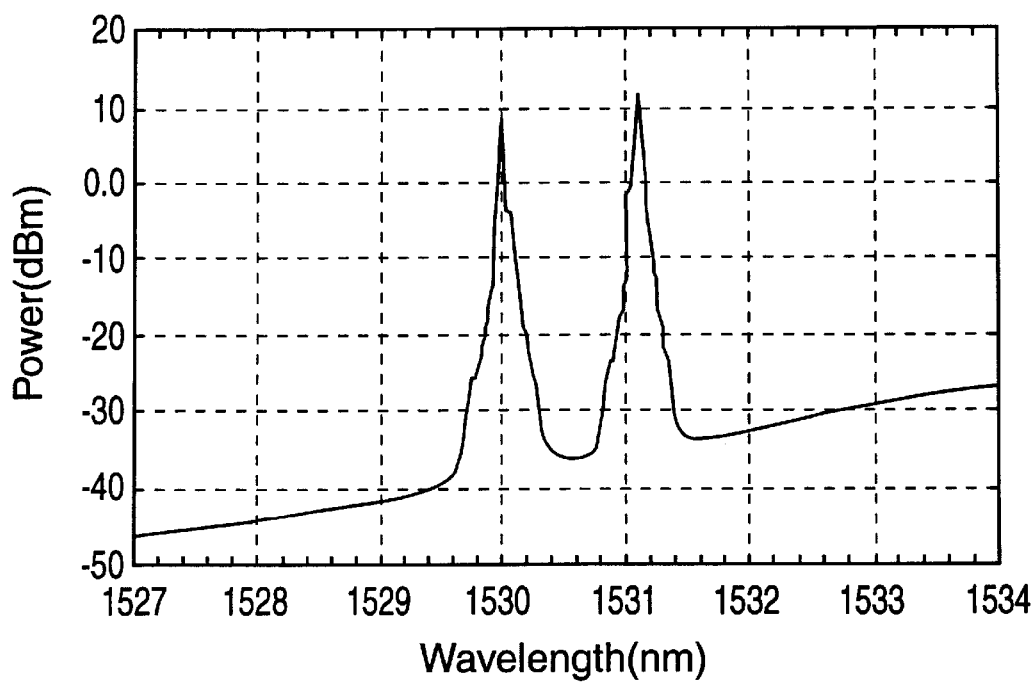
FIG. 10A is a view showing input side status for describing a fifth example of FWM light generation status with two lights.
Figure 10B:
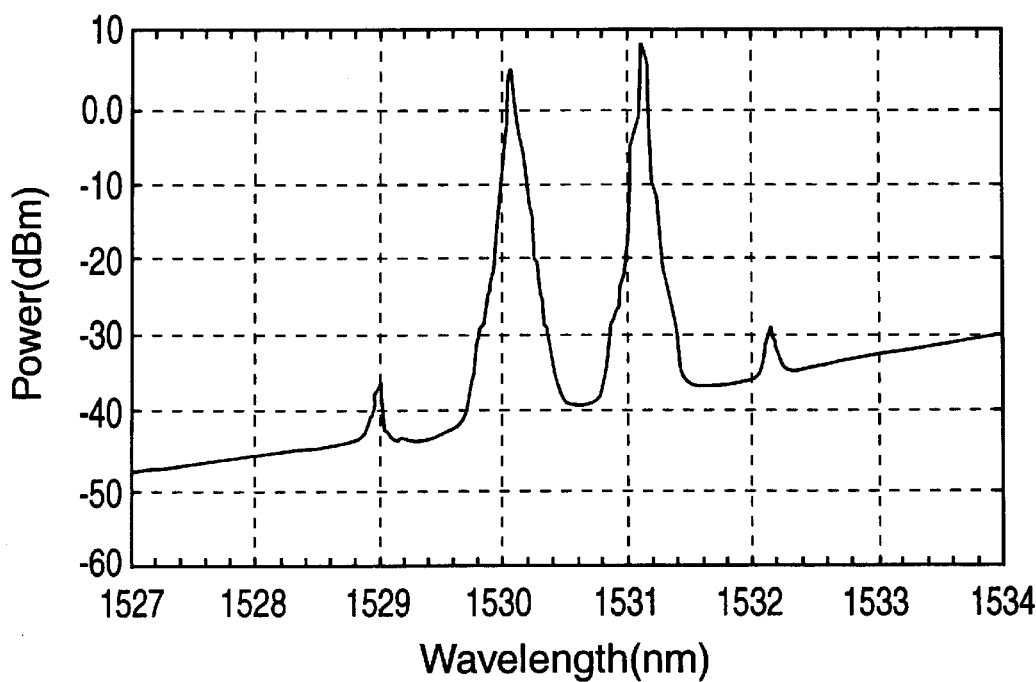
FIG. 10B is a view showing output side status.
Figure 11A:
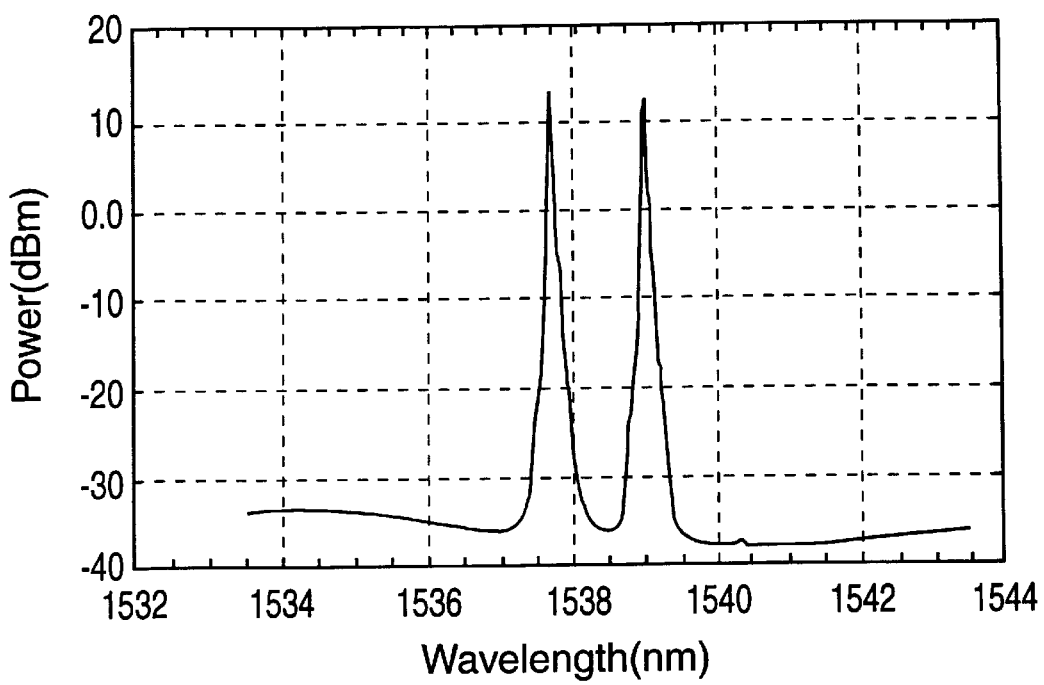
FIG. 11A is a view showing input side status for describing a sixth example of FWM light generation status with two lights.
Figure 11B:
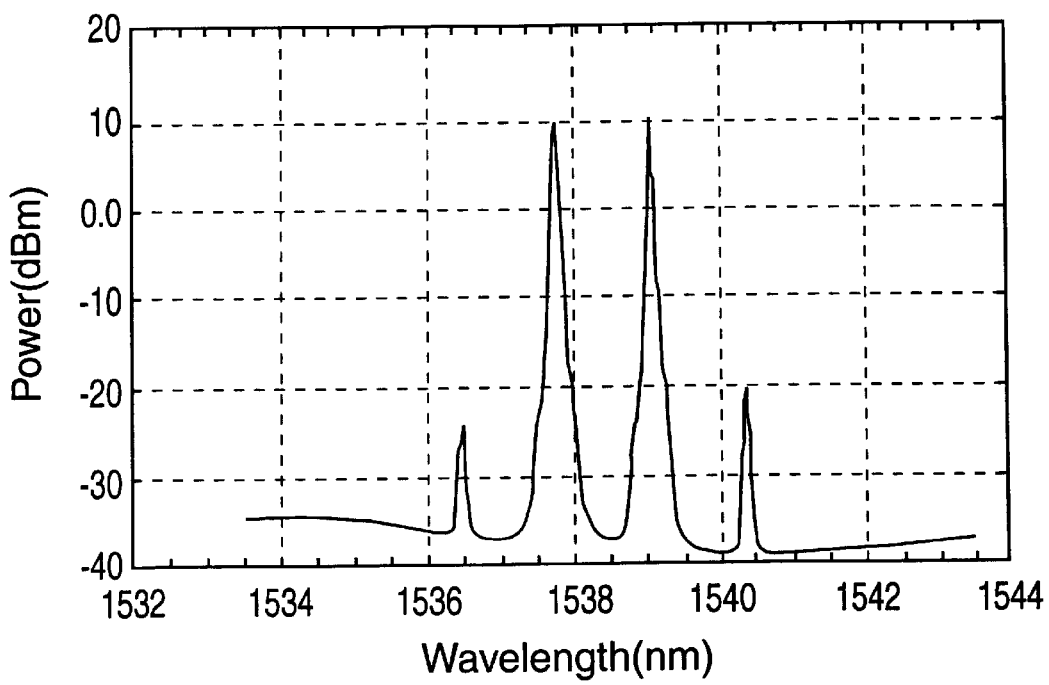
FIG. 11B is a view showing output side status.
Figure 12A:
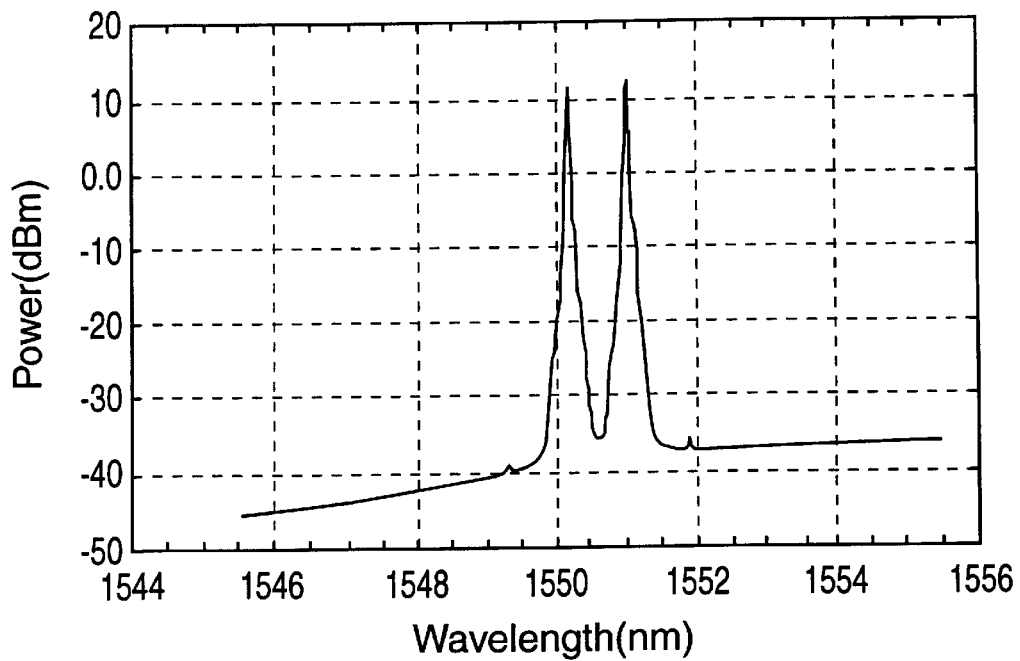
FIG. 12A is a view showing input side status for describing a seventh example of FWM light generation status with two lights.
Figure 12B:
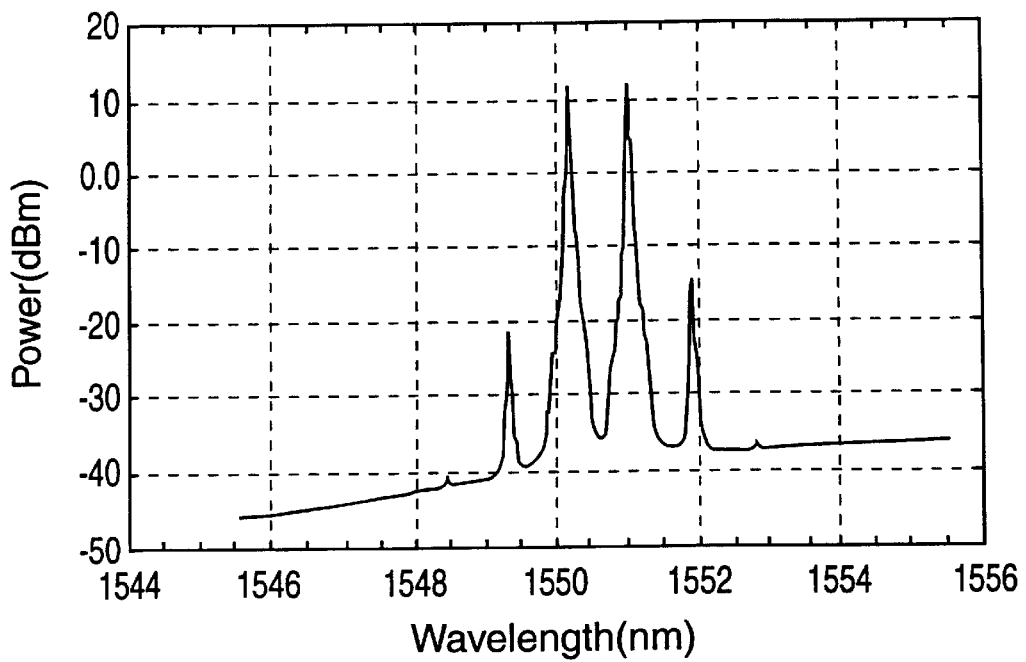
FIG. 12B is a view showing output side status.
Figure 13A:
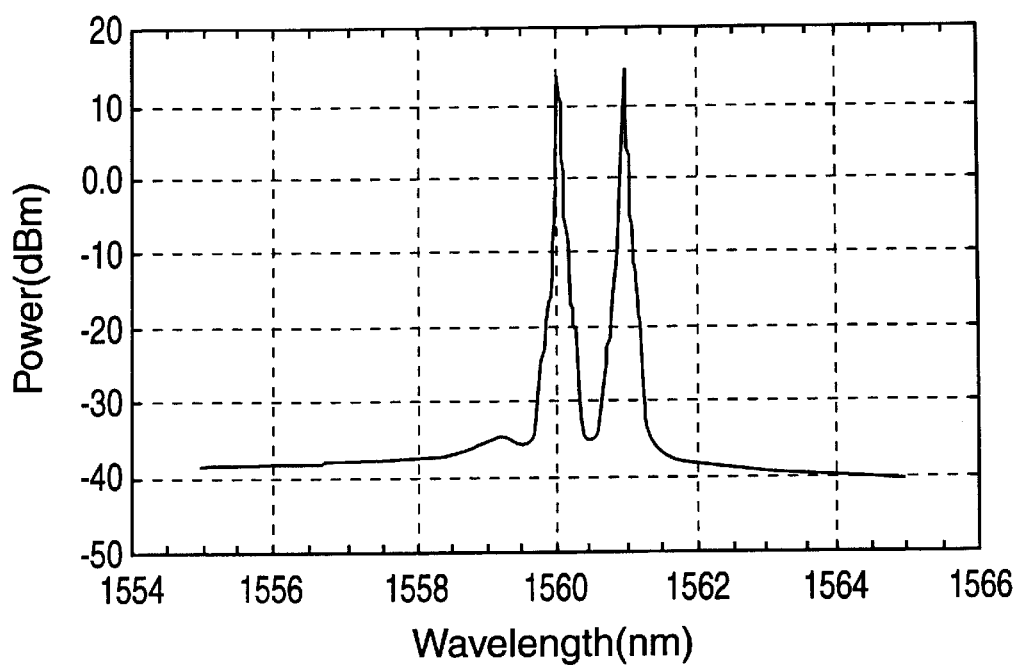
FIG. 13A is a view showing input side status for describing an eighth example of FWM light generation status with two lights.
Figure 13B:
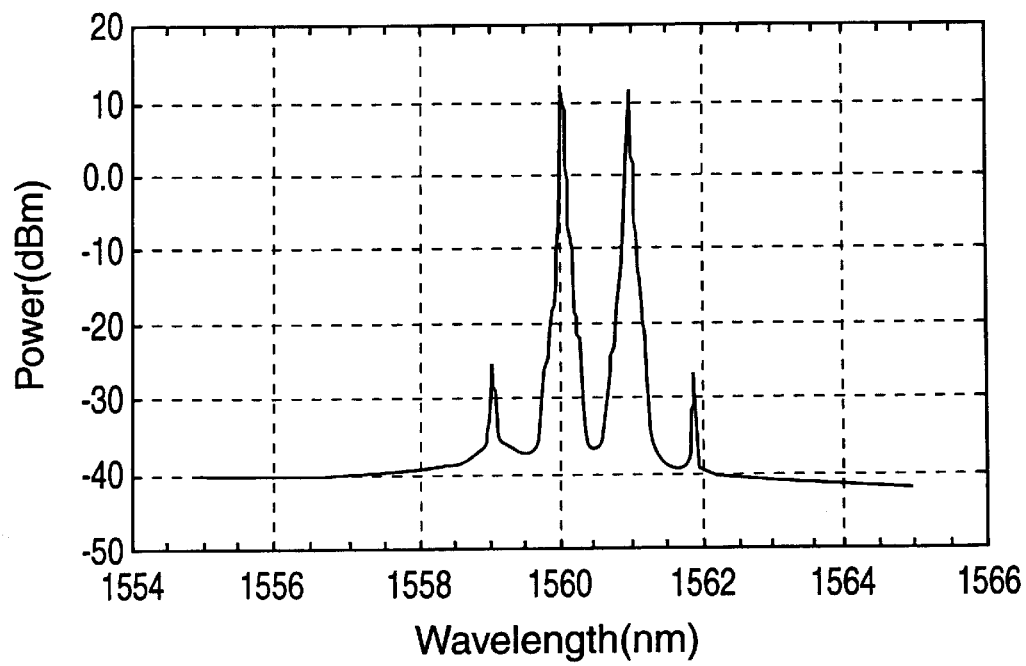
FIG. 13B is a view showing output side status.
Figure 14:
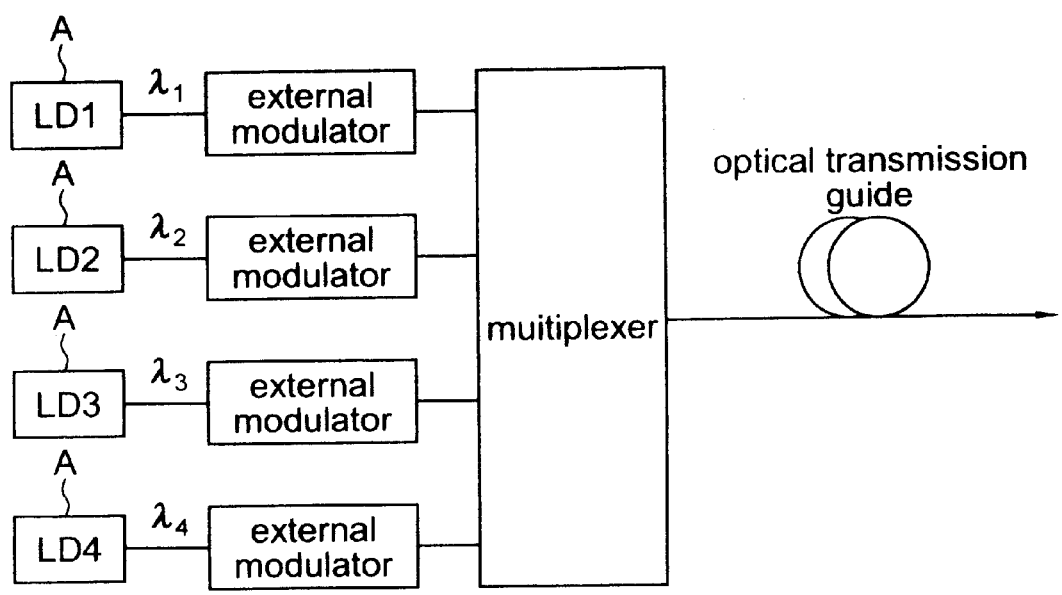
FIG. 14 is a view for describing an example of optical transmitter used in prior art wavelength-multiplexed optical communication.

FIGS. 10 to 13 show results of measurements in the case of fusion splicing the LD 15 by setting the X-Y coordinates of the two PANDAs 90-degrees out-of-phase from each other, i.e., setting the angle between the two input beam polarization planes to 90 degrees. In these Figures, the graph in A shows the state of the input light, and the graph in B shows the state of the output light. FIG. 10 concerns the case where the LDs generate linearly polarized beam of 1,530 and 1,531 nm in wavelength. FIG. 11 concerns the case with the wavelengths of 1,538 and 1,539 nm. FIG. 12 concerns the case with the wavelengths of 1,550 and 1,551 nm. FIG. 13 concerns the case with the wavelengths of 1,560 and 1,561 nm. Although secondary FWM light is measured in these cases, the generation efficiency is low compared to the case where the inter-polarization plane angle is zero degree.

Subsequently, the efficiency of FWM light generation in the measuring system was theoretically determined. The power of the FWM light is given by Formula 1 where:

n: index of refraction of the core at the FWM light wavelength

λ: FWM light wavelength $X_{Fijk}$: tertiary non-linear sensitivity factor tensor $A_{eff}$: effective core sectional area α: attenuation coefficient of the fibers L: length of the fibers $P_i$, $P_j$, $P_k$: input light power (j=k)

η: out-of-phase degree.

Figure 5:
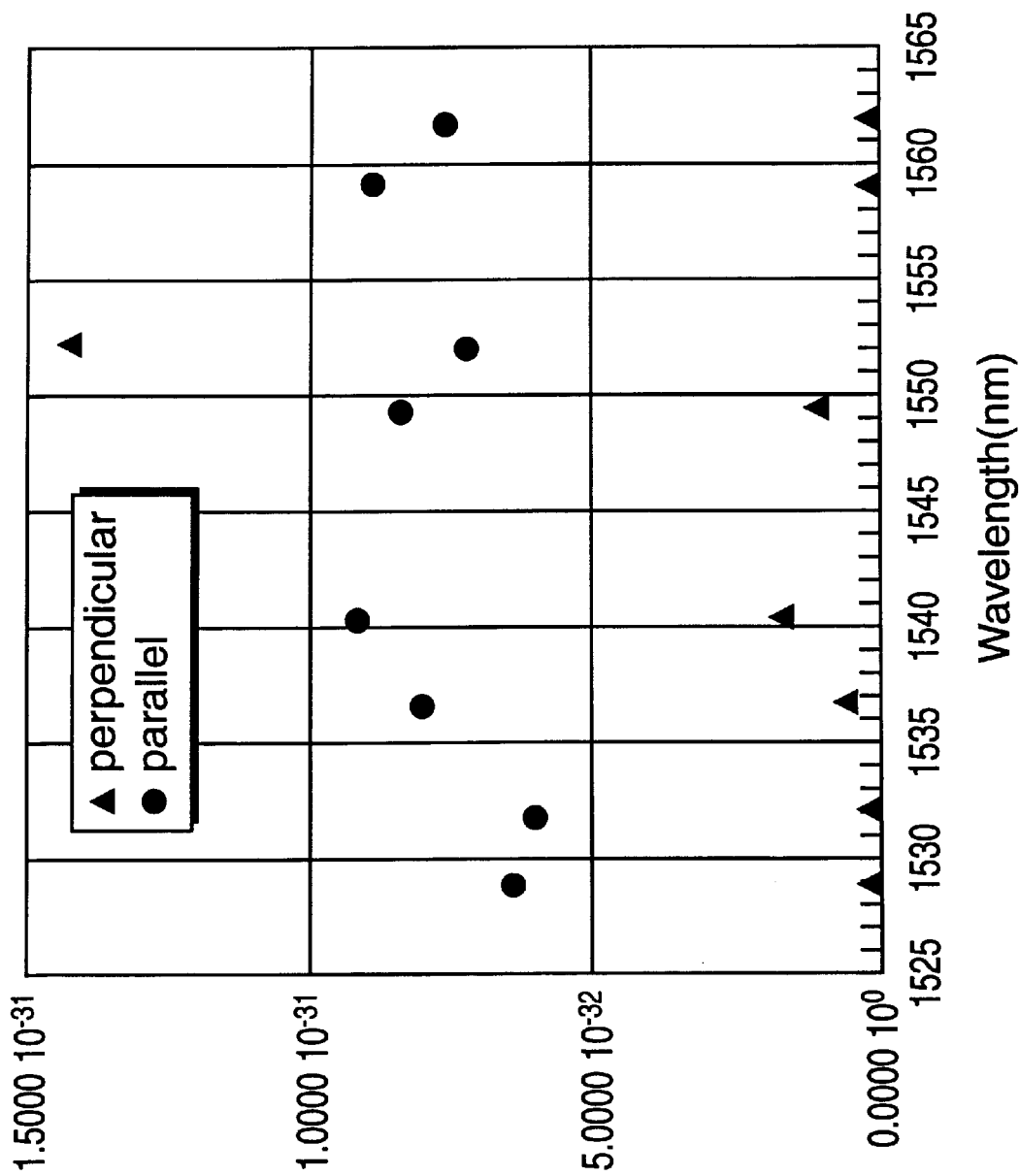
FIG. 5 is a view for describing difference of the FWM light generation efficiency with difference of the polarization state.

In the experiments, the efficiency of primary FWM light generation was compared with a quantity given by Formula 2. In Formula 2, the difference of ASE power at the same wavelength of input light from the peak power of the measured FWM light was substituted for PF. The results are shown in Tables 2 and 3 and FIG. 5. Depending on the state of polarization, the value of Formula 3 varied by the order of about one decimal place. Difference with wavelengths were not so outstanding. FIG. 5 shows 11 high value points in the case of the perpendicular polarization, and this is presumably due to a dead mode of input light. Table 2 concerns the case where planes of polarization of the two input beams are parallel, and Table 3 concerns the case where the plane of polarization of the two input beams are perpendicular.

$$P_F(L) = \frac{1024\pi^6}{n^4\lambda^2c^2}(3X_{Fijk})^2\frac{P_i(0)P_j(0)P_k(0)}{A_{eff}^2}e^{-\alpha L}\frac{(1-e^{-\alpha L})^2}{\alpha^2}\eta \quad \text{(Formula 1)}$$

$$\frac{(3X_{Fijk})^2\eta}{n^4} = \frac{P_F(L)}{\frac{1024\pi^6}{\lambda^2c^2}\frac{P_i(0)P_j(0)P_k(0)}{A_{eff}^2}e^{-\alpha L}\frac{(1-e^{-\alpha L})^2}{\alpha^2}} \quad \text{(Formula 2)}$$

$$\frac{(3X_{Fijk})^2\eta}{n^4} \quad \text{(Formula 3)}$$

TABLE 2

| FWM light wavelength (in nm) | $\frac{(3X_{Fijk})^2\eta}{n^4}$ |
|---|---|
| 1529 | 1.3037E–33 |
| 1532.1 | 2.6427E–33 |
| 1536.5 | 6.0571E–33 |
| 1540.3 | 1.7776E–32 |
| 1549.3 | 1.1233E–32 |
| 1551.9 | 1.4431E–31 |
| 1559 | 2.0994E–33 |
| 1561.8 | 1.3704E–33 |

TABLE 3

| FWM light wavelength (in nm) | $\frac{(3X_{Fjik})^2\eta}{n^4}$ |
|---|---|
| 1529.1 | 6.3789E–32 |
| 1531.9 | 6.0028E–32 |
| 1536.5 | 7.9461E–32 |
| 1540.3 | 9.2006E–32 |
| 1549.3 | 8.3805E–32 |
| 1551.9 | 7.2326E–32 |
| 1559.1 | 8.9254E–32 |
| 1561.8 | 7.5671E–32 |

From the above results, it was found that, depending on the state of polarization of the source light, the power of the FWM light is changed to change the efficiency of the light generation. With this finding born in mind, in the SC light source 4 using the polarization maintaining fibers according to the invention, the angle between the planes of polarization of the component wavelength light of the source light are made is set to zero, i.e., the planes of polarization are made parallel. By so doing, it is possible to greatly increase the efficiency of the FWM light generation in the fibers. With the conventional SC light source 4, which uses ordinary fibers other than the polarization maintaining fiber and is not connected to any extended polarization maintaining fiber, by making the planes of polarization of the inputted light waves for increasing the FWM light generation efficiency, the efficiency can not be obtained due to changes in the planes of polarization in the fibers.

INDUSTRIAL UTILITY

The optical transmitter according to the invention has the following effects.

1. Since desired wavelength light is derived from light from the SC light source by using the polarization maintaining optical demultiplexer and then externally modulated for the optical signal transmission, wavelength variations hardly occur, a number of optical signals can be arranged in a narrow bandwidth range, which it is utilized by the optical amplifier, for the communication.

2. Since the polarization maintaining optical demultiplexer is inexpensive and has stable aging characteristics, it is possible to ensure excellent performance in even a wavelength-division multiplexed optical communication system, in which stringent wavelength management is necessary, and also inexpensively.

3. The branching characteristics provided by the polarization maintaining optical demultiplexer can be readily changed, thus providing high degree of design freedom. The invention thus find a wide scope of applications.

4. It is possible to provide even pulse source light with a wavelength spread, and the invention is thus applicable to a system utilizing such pulse light as well.

What is claimed is:

1. An optical transmitter comprising:
   a supercontinuum light source, which is composed of an optical amplifier made by using a polarization maintaining amplification fiber and a polarization maintaining fiber which has a length of at least a specified value, connected to the output side of the optical amplifier and emitting light having a continuous wave and a stable plane of polarization;

an optical demultiplexer of polarization maintaining type which filters out a light with a desired wavelength from the continuous-wave light; and an external modulator which superposes desired information upon the light with the desired wavelength, wherein the polarization maintaining amplification fiber of the supercontinuum light source and the polarization maintaining fiber are connected so that their axes of the planes of polarization coincide.

2. The optical transmitter according to claim 1, wherein the polarization maintaining amplification fiber and/or polarization maintaining optical fiber are/is of a dispersion shift type or a dispersion flat type.

3. The optical transmitter according to claim 1, wherein continuous light is inputted as source light to the supercontinuum light source.

4. The optical transmitter according to claim 2, wherein continuous light is inputted as source light to the supercontinuum light source.

5. The optical transmitter according to claim 1, wherein light other than single frequency light is inputted as source light to the supercontinuum light source.

6. The optical transmitter according to claim 2, wherein light other than single frequency light is inputted as source light to the supercontinuum light source.

7. The optical transmitter according to claim 3, wherein light other than single frequency light is inputted as source light to the supercontinuum light source.

8. The optical transmitter according to claim 4, wherein light other than single frequency light is inputted as source light to the supercontinuum light source.

* * * * *